US 7,346,055 B2

United States Patent
Chen et al.

(10) Patent No.: US 7,346,055 B2
(45) Date of Patent: *Mar. 18, 2008

(54) METHOD AND SYSTEM FOR CO-RELATING TRANSPORT PACKETS ON DIFFERENT CHANNELS USING A UNIQUE PACKET IDENTIFIER

(75) Inventors: Iue-Shuenn Chen, San Diego, CA (US); Rajesh Mamidwar, San Diego, CA (US); Francis Cheung, Del Mar, CA (US); Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 981 days.

This patent is subject to a terminal disclaimer.

(21) Appl. No.: 10/392,471

(22) Filed: Mar. 19, 2003

(65) Prior Publication Data
US 2004/0042457 A1 Mar. 4, 2004

Related U.S. Application Data

(60) Provisional application No. 60/406,707, filed on Aug. 29, 2002.

(51) Int. Cl.
*H04L 12/28* (2006.01)
*H04H 1/04* (2006.01)

(52) U.S. Cl. .................. 370/390; 370/394; 370/487; 370/389

(58) Field of Classification Search ............... 370/535, 370/536, 538, 395.42, 395.64, 389, 485, 370/486, 487, 390, 218, 219; 380/200, 201, 380/210
See application file for complete search history.

(56) References Cited

U.S. PATENT DOCUMENTS

| 7,124,303 | B2* | 10/2006 | Candelore et al. | 713/193 |
|---|---|---|---|---|
| 7,127,619 | B2* | 10/2006 | Unger et al. | 713/193 |
| 7,151,831 | B2* | 12/2006 | Candelore et al. | 380/200 |
| 7,215,770 | B2* | 5/2007 | Pedlow, Jr. et al. | 713/193 |
| 7,218,610 | B2* | 5/2007 | Sivakumar et al. | 380/200 |
| 2004/0042494 | A1* | 3/2004 | Chen et al. | 370/474 |

\* cited by examiner

*Primary Examiner*—Hanh Nguyen
(74) *Attorney, Agent, or Firm*—McAndrews, Held & Malloy, Ltd.

(57) ABSTRACT

Aspects of the present invention may include replicating a first primary packet to create a second primary packet for a particular channel. A unique identifier may be assigned to the first primary packet and a different unique identifier may be assigned to the second primary packet. The first primary packet may be replicated in order to create a first secondary packet and the second primary packet may be replicated to create a second secondary packet. In response to the receipt of the new stream with replicated packets, the first or said second primary packet may be selected and the first or second secondary packet may be selected for a particular PID based on the assigned unique identifier. The selections may be done to co-relate the selected first and/or second primary packet with a legacy system or the selected first and/or second secondary packet with a new system.

72 Claims, 7 Drawing Sheets

METHOD AND SYSTEM FOR CO-RELATING TRANSPORT PACKETS ON DIFFERENT CHANNELS USING A UNIQUE PACKET IDENTIFIER

RELATED APPLICATIONS

This application makes reference to, claims priority to and claims the benefit of U.S. Provisional Patent Application Ser. No. 60/406,707 filed on Aug. 29, 2002.

FEDERALLY SPONSORED RESEARCH OR DEVELOPMENT

[Not Applicable]

MICROFICHE/COPYRIGHT REFERENCE

[Not Applicable]

FIELD OF THE INVENTION

Embodiments of the present application relate generally to the MPEG packet transport, and more particularly to a system and method for co-relating MPEG transport packets.

BACKGROUND OF THE INVENTION

The introduction of broadband networks, headend and terminal devices such as set-top boxes, and media such as DVD disks recorded with digitally compressed audio, video and data signals, for example, which utilize motion Picture Expert Group (MPEG) compression standards, may provide sound and picture quality that is virtually indistinguishable from the original material. One of the most popular MPEG standards is MPEG-2, which provides the necessary protocols and infrastructure that may be used for delivering digital television or DVD contents with compressed audio, video and data signals. A detailed description of the MPEG 2 standard is published as ISO/IEC Standard 13818. As broadband networks continue to evolve, there is a need to provide access for legacy devices to ensure interoperability with legacy and disparate systems.

An MPEG program may contain a plurality of data streams. For example, it may contain streams of compressed digital video and audio as well as streams for program control information. Video and audio encoders compress video and audio contents, respectively, into so called elementary streams (ES). In MPEG-2, these streams may encapsulate some other information such as decoding and presentation timestamps to generate packetized elementary streams (PES). All these streams may be encoded and multiplexed next into a transport stream (TS) for transmission. The TS may be de-multiplexed and compressed video and audio streams may be decoded in a set-top box (STB) and viewed on a TV. For the entire system, the type of encoding process, including TS encoding, may determine whether another device, e.g. STB, will be able to decode and interpret a received MPEG data stream. In this regard, the other devices may be a legacy or disparate device.

In a typical MPEG data stream, the length of individual ESs may be equivalent to the length of the program. Each ES may be encapsulated in a plurality of variable-length packets called a PES. The PES may include a header that may precede one or more payload bytes. The header may include information pertaining to the encoding process required by the MPEG decoder to decompress and decode a received ES.

Each individual ES may have a corresponding PES and any encoded audio and video information may still reside in separate PESs. Notably, the PES may be viewed primarily as a logical construct and is not intended to be utilized for data interchange, transport, and interoperability. Notwithstanding, the PES may be utilized for conversion between two types of system streams, namely, TS and program stream (PS).

The TS and PS may be formed by multiplexing a plurality of PES packets. The TS may include a plurality of additional packets that may contain tables, which may be necessary for de-multiplexing the TS. The tables may be collectively called program specific information (PSI). To maintain synchronization and timing, null packets may also be inserted to fill the intervals between information-bearing packets. Timing information for an associated program may be carried by specific packets. One type of timing information may be called the program clock reference (PCR). The PCR may be located in one of the optional header fields of the TS packet. During operation, the PCR may permit the decoder to synchronize its clock to the same frequency as that of the original encoder's clock frequency. TS packets may have a fixed length of 188 bytes, which may include a header having a minimum size of 4 bytes and a maximum payload of 184 bytes.

FIG. 1 is a diagram of the structure for an exemplary MPEG transport stream 100. Referring to FIG. 1, TS 100 consists of TS packets. Each TS packet includes a header 102 and payload 104. TS packet header 102 may include the following fields: synchronization (SYNC) 106, transport error indicator 108, payload unit start indicator 110, transport priority 112, packet ID (PID) 114, transport scrambling control 116, adaptation field control 118, continuity counter 120, and adaptation field 122. The adaptation field 122 may further include the following fields: adaptation field length 132, discontinuity indicator 134, random access indicator 136, ES priority 138, flags 140, optional fields 142 and stuffing bytes 144. The optional fields 142 may further include the following: program clock reference (PCR) 146, OPCR 148, a splice countdown 150, private data length 152, adaptation field extension length 154, flags 156 and optional field 158. The payload may be a plurality of PES, namely PES1 124, PES2 126, ..., PESn 130.

The TS 100 may include variable length PES that may be divided into fixed length packets for use by a transmission system. In this regard, the information added by the TS is additional to the information contained in the headers of the PESs. SYNC byte 106 may be used to delineate the beginning and ending of TS packet 100. The transport error indicator 108 may indicate when there is an error in a packet or block. This may be particularly useful for error block detection. The packet identifier (PID) 114 may be a unique identifier that may identify every video and audio stream. Additionally, each PSI table may have a unique PID 114. The PID 114 may be utilized for identifying a channel and may include any information required for locating, identifying and reconstructing programs. Some PIDs are reserved for specific uses by the MPEG protocol. PID values may be stored in PSI tables. In order to ensure that all the audio, video and data for a program are properly decoded, it may be critical to ensure that the PIDs are correctly assigned and that the PSI tables correspond with their associated audio and video streams.

PCR 146 may have 42 bits which represents 27 MHz clock ticks and 33 bits of PCR base represent 90 kHz ticks. The bits in PCR 146 may provide program clock recovery information that may be utilized for synchronization. PCR 146 may be used to provide a clock recovery mechanism for MPEG programs. A 27 MHz system time clock (STC) signal may typically be used for encoding MPEG signals. Decoding of the signal requires a clock that may be locked to the encoder's STC of 27 MHz. Notably, the PCR 146 may be utilized by the decoder to regenerate a local clock signal that is locked to the STC. Whenever a program is placed in the transport stream, a 27 MHz time stamp may be inserted into the PCR 146. When the signal is received by a decoder, the decoder may compare the value in the PCR 146 with the frequency of its local voltage controlled oscillator (VCO) and adjust the VCO to ensure that the VCO is locked to the frequency specified by the PCR 146. To ensure accuracy, the PCR 146 may be updated with the STC every about 100 ms.

The continuity counter (CC) 120 may be used to determine when packets are lost or repeated. It may include a 4-bit field, which may be repeatedly incremented from zero to 15 for each PID. Discontinuity indicator 134 may permit a decoder to handle discontinuities in the transport stream. Discontinuity indicator 134 may indicate a time base such as the PCR 146 and continuity counter 120 discontinuities. Random access indicator 136 may be configured to indicate whether the next PES packet in the PID stream contains a video-sequence header or the first byte of an audio frame. Splice countdown 150 may be configured to indicate the number packets of the same PID number to a splice point occurring at the start of PES packets.

An MPEG TS may be a multi-program TS or a single program TS (SPTS). A number of SPTSs may be multiplexed to create a multi-program TS. In some cases, the program may include one or more ESs that may have a similar time reference. This may occur, for example, in a movie that has video and its corresponding audio content.

PSI may include a set of tables that may be part of a TS. The tables in the PSI may be required while de-multiplexing the TS and for matching PIDs to their corresponding streams. Once the PIDs are matched to their corresponding streams, the TS may be decoded by assembling and decompressing program contents. Typically, in order to determine which audio and video PIDs contain the corresponding content for a particular stream, a program map table (PMT) may be decoded. Each program may have its own PMT bearing a unique PID value. The PAT may be decoded in order to determine which PID contains the desired program's PMT. The PAT may function as the master PSI table with PID value always equal to 0. In a case where the PAT cannot be found and decoded in the TS, no programs may be available for presentation.

The PSI table may be refreshed periodically at a rate that is fast enough to allow a STB to go through program recovery and decompression processes. This may be necessary to ensure real-time user interaction. The PSI may also be used to determine the accuracy and consistency of PSI contents. Notwithstanding, during programs changes or modification of multiplexer provisioning, there may be packets which have a PID value present in the TS, but have no corresponding reference in the PSI. Additionally, the PSI may have references to one or more packets in the PID that are not present in the TS.

In existing MPEG compliant systems, audio/video streams may be carried using MPEG-2 transport packets. Multiple streams may be differentiated using a PID contained in a packet header called the transport packet header. Transport packets from various streams may be multiplexed and transmitted on the same physical medium. Exemplary media may include, copper, coaxial cable, wireless, optical and any combination thereof. On the receiver side transport packets may be de-multiplexed and data may be separated for each stream. For example, audio packets may be extracted from the transport stream and separated from video packets.

Transport packets may include three fields, namely a 4-byte header, an optional adaptation field and a packet payload. The packet payload may not be altered by multiplexing or transmitting equipment, except during processing which may include data encryption and decryption. In generally, encryption may be done once within a typical MPEG processing system. Notwithstanding, some fields of adaptation field may be changed by multiplexing and transmission equipment. Typically, packet order within a PID channel may be maintained from an MPEG encoder to an MPEG receiver but packet order among multiple PID streams may not guaranteed by during transmission by any transmitting equipment. In cases where co-relation of packets from different PIDs may be required, packet position in a stream cannot be utilized since packet order among multiple PID channels may be altered.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention provide a method and system for co-relating transport packets on different PIDs for compatibility with a new system and a legacy system using packet identifiers (PIDs). The method for co-relating packets using PIDs may include the step of replicating a first primary packet in an assigned primary PID to create a second primary packet for the same primary PID. The first primary packet may also be replicated in order to create a first secondary packet in an assigned secondary PID and the second primary packet may also be replicated to create a second secondary packet for the same secondary PID. In response to receipt of a TS stream with replicated packets, the first and/or the second primary packet may be selected for the legacy system and the first and/or second secondary packet may be selected for the new system based on the assigned unique identifier. The selections may be done to co-relate the selected first and/or second primary packet with a legacy system or the selected first and/or second secondary packet with a new system.

The step of replicating a first primary packet to create a second primary packet may further include the step of assigning a packet sequence number to the second primary packet so that the assigned packet sequence number may be consecutive to a packet sequence number of the first primary packet. A packet sequence number for successive packets for the particular PID may be adjusted so that the successive packets may remain in sequence relative to the second primary packet. The selecting step may include the step of receiving the first primary packet and/or the second primary packet for the particular PID by the legacy system. A decoder for the legacy system may decode the received first primary packet or the second primary packet. The selecting step may further include the step of receiving the first secondary packet and/or the second secondary packet from another PID by the new system. A decoder for the new system may decode the selected first secondary packet or the second secondary packet.

The selecting step may further include the step of selecting a primary packet PID corresponding to one of the first primary packet and the second primary packet if the receiving system is the legacy system. A secondary packet PID corresponding to one of the first secondary packet or the second secondary packet may be selected if the receiving system is the new system. The step of replicating the first primary packet to create a first secondary packet and replicating the second primary packet to create a second secondary packet may further include the step of assigning a packet sequence number to the second secondary packet that is consecutive to a packet sequence number of the first secondary packet.

The first secondary packet and the first primary packet may have the same unique identifier while the second secondary packet and the second primary packet may have the same unique identifier. The unique identifier may be an n-bit number, where n is an integer greater than zero (0). The number may be alphabetic, numeric or alphanumeric.

Another embodiment of the invention may provide a machine-readable storage, having stored thereon a computer program having at least one code section executable by a machine for causing the machine to perform the steps for co-relating transport packets having different PIDs for compatibility with a new system and a legacy system using the unique identifier as described above.

Another aspect of the invention may provide a system for co-relating transport packets on different PIDs for compatibility with a new system and a legacy system using packet identifiers (PIDs). The system for co-relating packets using PIDs may include at least one replicating processor adapted to replicate a first primary packet in an assigned primary PID to create a second primary packet for the same primary PID. The replicating processor may also replicate the first primary packet to create a first secondary packet in an assigned secondary PID. The replicating processor may also replicate the second primary packet to create a second secondary packet for the same secondary PID. In response to receipt of a TS stream with replicated packets by a receiver, a selector may be adapted to select the first and/or the second primary packet for the legacy system. The selector may also be adapted to select the first and/or second secondary packet for the new system based on the assigned unique identifier. The selector may be configured to co-relate the selected first and/or second primary packet with a legacy system and also co-relate the selected first and/or second secondary packet with a new system.

An assignor may be adapted to assign a packet sequence number to the second primary packet so that the assigned packet sequence number may be consecutive to a packet sequence number of the first primary packet. An adjuster may be adapted to adjust a packet sequence number for successive packets for the particular PID so that the successive packets may remain in sequence relative to the second primary packet. The receiver may receive the first primary packet and/or the second primary packet for the particular PID by the legacy system for processing. A decoder associated with the legacy system may be adapted to decode the received first primary packet or the second primary packet. The receiver may receive the first secondary packet and/or the second secondary packet from another PID by the new system. A decoder associated with the new system may be adapted to decode the selected first secondary packet or the second secondary packet.

In one aspect of the invention, the selector may select a primary packet PID corresponding to one of the first primary packet and the second primary packet if the receiving system is the legacy system. In another aspect of the invention, the selector may select a secondary packet PID corresponding to one of the first secondary packet or the second secondary packet if the receiving system is the new system. An assignor may be adapted to assign a packet sequence number to the second secondary packet that is consecutive to a packet sequence number of the first secondary packet. The first secondary packet and the first primary packet may have the same unique identifier while the second secondary packet and the second primary packet may have the same unique identifier. The unique identifier may be an n-bit number, where n is an integer greater than zero (0). The number may be alphabetic, numeric or alphanumeric.

These and other advantages, aspects and novel features of the present invention, as well as details of an illustrated embodiment thereof, will be more fully understood from the following description and drawings.

DETAILED DESCRIPTION OF THE INVENTION

Figure 1:
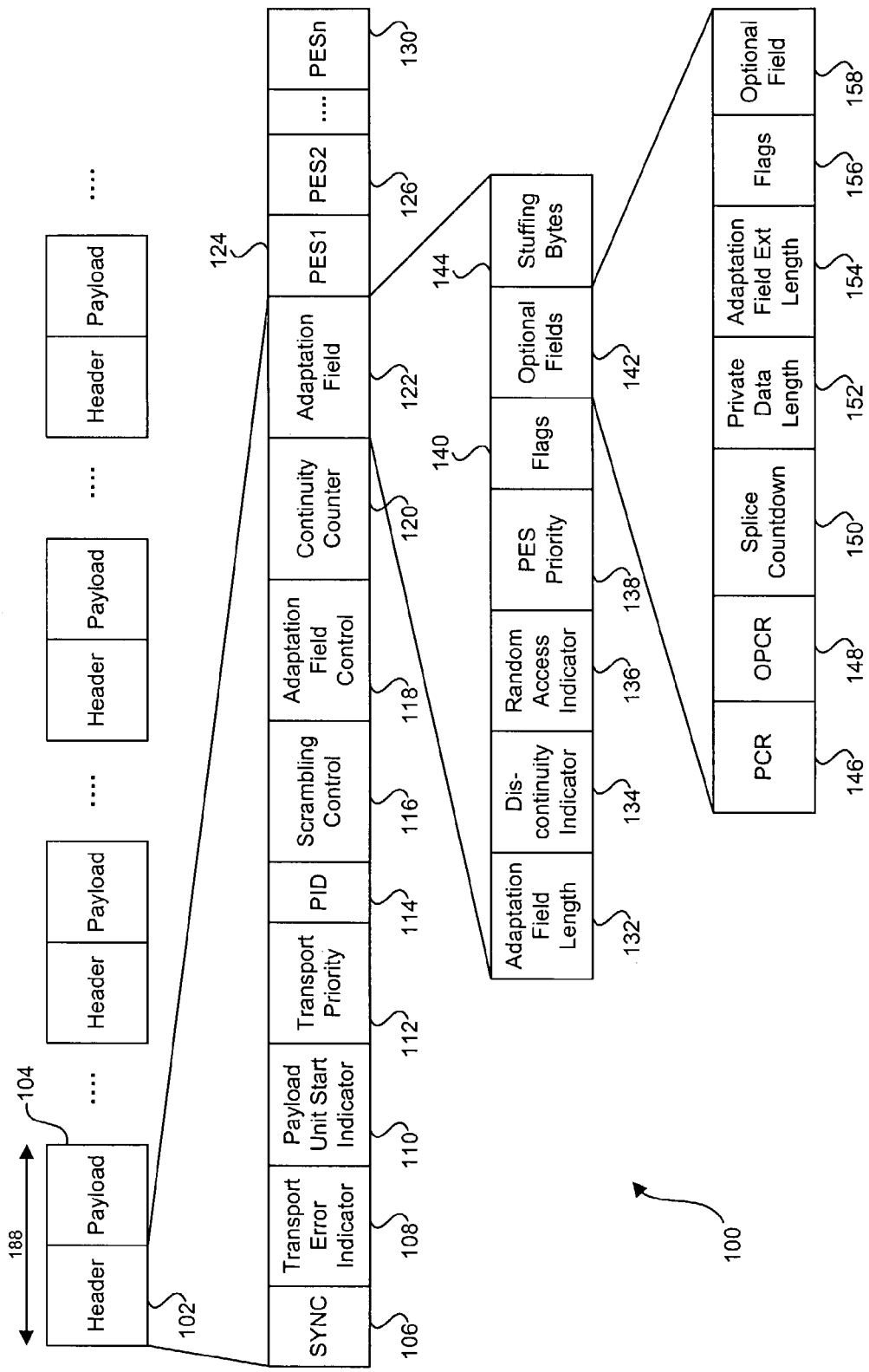
FIG. 1 is a diagram of the structure for an exemplary MPEG transport stream.
Figure 1A:
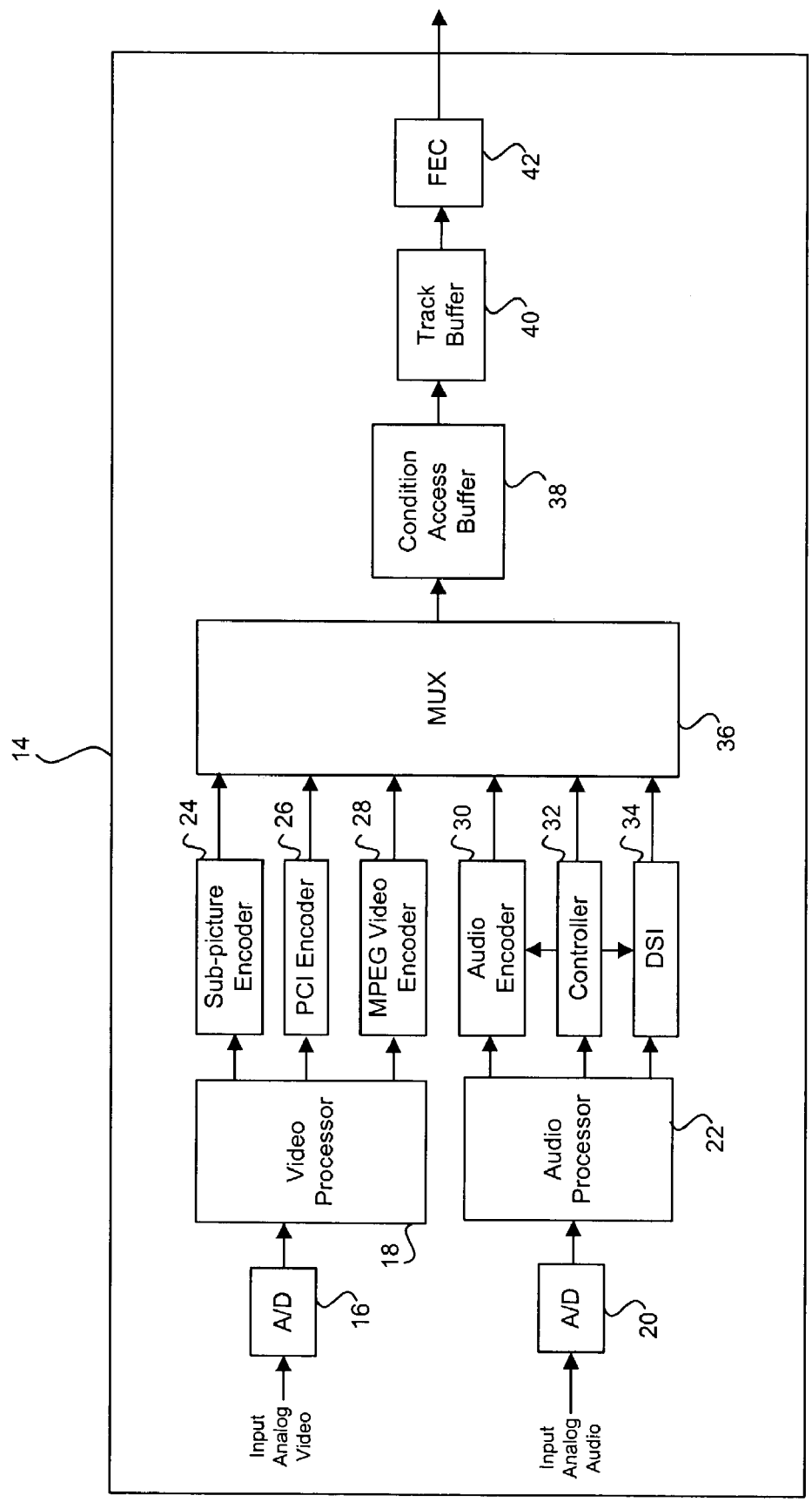
FIG. 1A is a block diagram of an exemplary MPEG encoding system.

FIG. 1A is a block diagram of an exemplary MPEG encoding system 14, in accordance with an embodiment of the invention. The MPEG encoding system 14 may be an embodiment of an MPEG encoding legacy system ("legacy system") or an embodiment of a new MPEG encoding system ("new system"), whereby the MPEG encoding system 14 may comprise suitable logic, circuitry and/or code to enable encoding of MPEG signals. As will be understood by persons of ordinary skill in the art, a legacy system may be different from a new system. However, it is also understood that in some instances, a new system and a legacy system may comprise similar high-level functionality, which may permit use of a same block diagram, for example MPEG encoding system 14 in FIG. 1A, to illustrate both a legacy system block diagram and a new system block diagram. A legacy system may comprise suitable logic, circuitry and/or code to enable encoding of MPEG signals according to a legacy system format. A new system may comprise suitable logic, circuitry and/or code to enable encoding of MPEG signals according to a legacy system format and/or a new system format. This may permit a new system to maintain backward compatibility with the legacy system format. Referring to FIG. 1A, an analog input signal may be converted to digital format by A/D converter 16. An output signal from the A/D converter 16 may be communicated to video processor 18 for processing. After the video processor 18 processes the signal, the output signal generated from the video processor 18 may be sent to a sub-picture encoder 24 for processing. A presentation control information (PCI) encoder 26 may be configured to encode PCI data for the video signal processed by video processor 22. The output signal generated from the video processor 18 may also be received and processed by an MPEG video encoder 28 which may be configured to format the video signal in MPEG format.

An analog input audio signal may be converted to digital format by A/D converter 20. An output signal from the A/D converter 20 may be communicated to audio processor 22 for processing. After the audio processor 22 processes the signal, the output signal generated from the audio processor 22 may be sent to an audio encoder 30 to be encoded in a suitable format. A data search information (DSI) encoder 34 may be configured to encode indexing and search data for the video signal processed by video processor 22. The outputs from the sub-picture encoder 24, PCI encoder 26, MPEG video encoder 28, audio encoder 30 and DSI encoder 34 may be multiplexed into a single data stream, by multiplexer 36. A controller 32 may be configured to control the operations of audio encoder 32, DSI encoder 34 and multiplexer (MUX) 36. The output of the MUX 36 may include a single steam, which may contain various kinds of PES. The PES may include, audio, video, PCI, DSI and sub-picture information.

The MPEG encoding system 14 may also include a conditional access buffer 38 that may be configured to controls propagation of the packets through MUX 36. A track buffer 40 may be used to buffer and assemble data packets for further processing. Finally, the assembled packets may be encoded with a forward error correction algorithm within the forward error correction block (FEC) 42 for transmission over a channel. The output of the FEC block 42 may be an MPEG formatted digital audio/video signal.

Figure 1B:
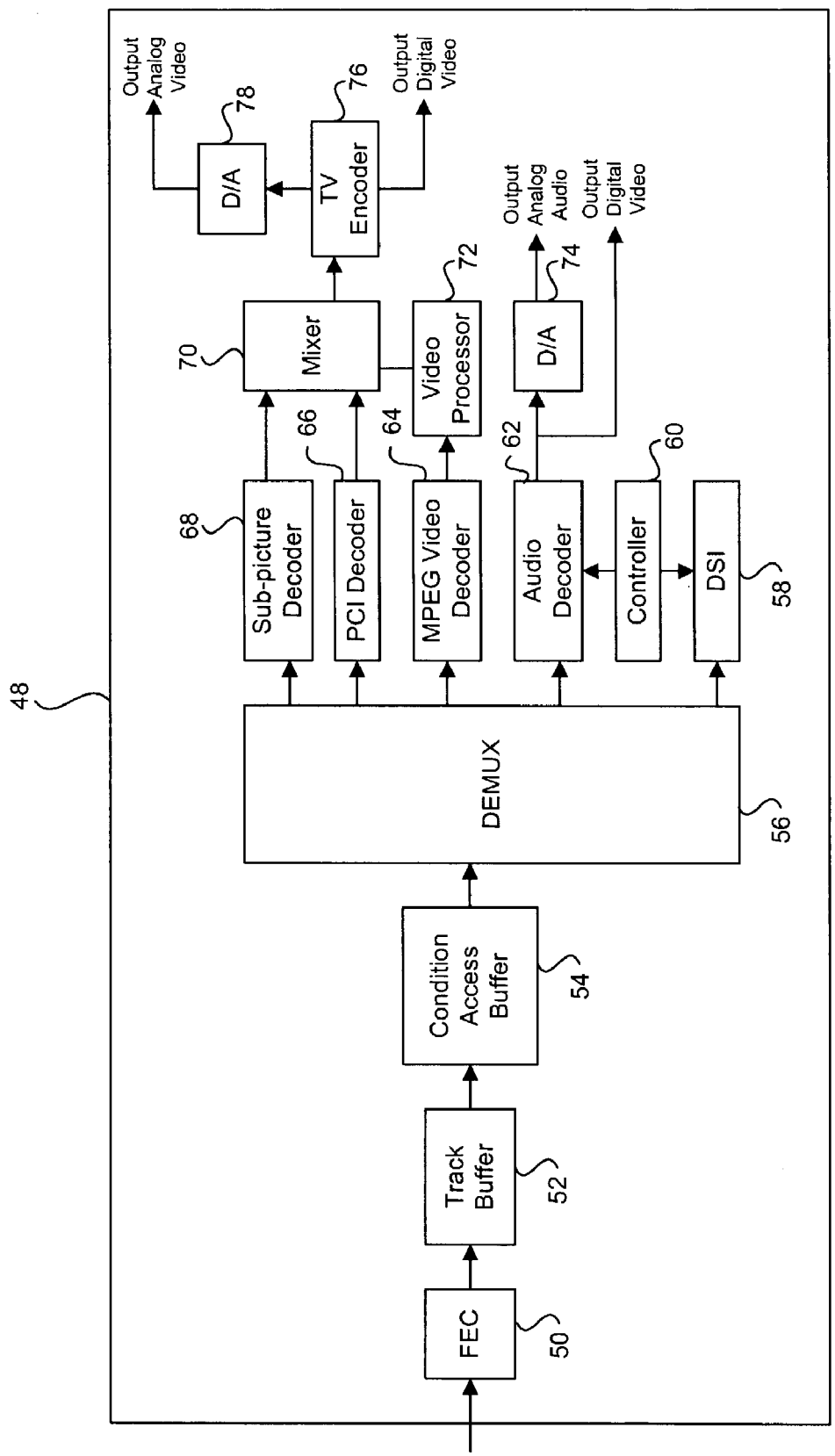
FIG. 1B is a block diagram of an exemplary MPEG decoding system.

FIG. 1B is a block diagram of an exemplary MPEG decoding system 48, in accordance with an embodiment of the invention. The MPEG decoding system 48 may be an embodiment of an MPEG decoding legacy system ("legacy system") and/or an embodiment of a new MPEG decoding system ("new system"), whereby the MPEG decoding system 48 may comprise suitable logic, circuitry and/or code to enable encoding of MPEG siginals according to a legacy system format and/or a new system format. MPEG decoding system 48 may be, for example, a set-top box. Referring to FIG. 1B, MPEG decoding system 48 may include a forward error correction processing block 50 and a track buffer 52. The track buffer 52 may be used to buffer and assemble data packets for further processing. The packets may be processed by a conditional access circuit 54 that may be configured to control propagation of the packets through de-multiplexer (DEMUX) 56 and into respective video and audio processing paths. The output of the DEMUX 56 may include various kinds of packetized elementary streams (PES), including audio, video, presentation control information (PCI), sub-picture information, and data search information (DSI) streams. The de-multiplexed PCI in the PES may be buffered prior to being decoded by PCI decoder 66.

The sub-picture information in the PES may be buffered and decoded by sub-picture decoder 68. The de-multiplexed video stream in the PES may be decoded by MPEG video decoder 64. Video processor 72 may be configured to process the output from the MPEG video decoder 64. Video processor 72 may be a microprocessor or an integrated circuit (IC). Subsequent to processing of the MPEG video, mixer 70 may combine the outputs of the PCI decoder 66, the video processor 64 and the sub-picture decoder 68 to form a composite video signal. The output of mixer 70 may thereafter be encoded in a conventional television signal format such as PAL, SECAM, or NTSC by the TV encoder 76. The output of the TV encoder 76 may be a digital video signal. However, D/A converter 78 may convert this digital video output signal to an analog video output signal.

The audio portion of the PES may be buffered and decoded by audio decoder 62. The output of the audio decoder 62 may be a digital audio signal. The audio D/A 74 may process digital audio received from the audio decoder 62 and produce an analog audio output signal. Audio decoder 62 may include a frame buffer sufficient for temporarily storing audio frames prior to decoding. Controller 60 may control the operation of audio decoder 62 and DSI 58. Controller 60 may be configured to utilize DMA to access to data in track buffer 52 or any other associated memory (not shown).

Aspects of the present invention may be implemented using, for example, a BCM 7100 or a BCM 7110 single-chip set-top box integrated circuit (IC) made by Broadcom Corporation of Irvine, California (Calif.). The BCM 7100 and the BCM 7110 are single-chip set-top box devices having functional blocks such as, MPEG-2 encoding and decoding interfaces, audio decoding interface, video decoding interface, NTSC/PAL video encoder, video processor and FEC blocks. In this regard, the BCM 7100 or the BCM 7110 may implement at least some of the features of the blocks in FIG. 1B. Aspects of a single-chip set-top box system may be found in U.S. patent application Ser. No. 09/969,212 filed Oct. 1, 2001, which is hereby incorporated by reference in its entirety.

Figure 2:
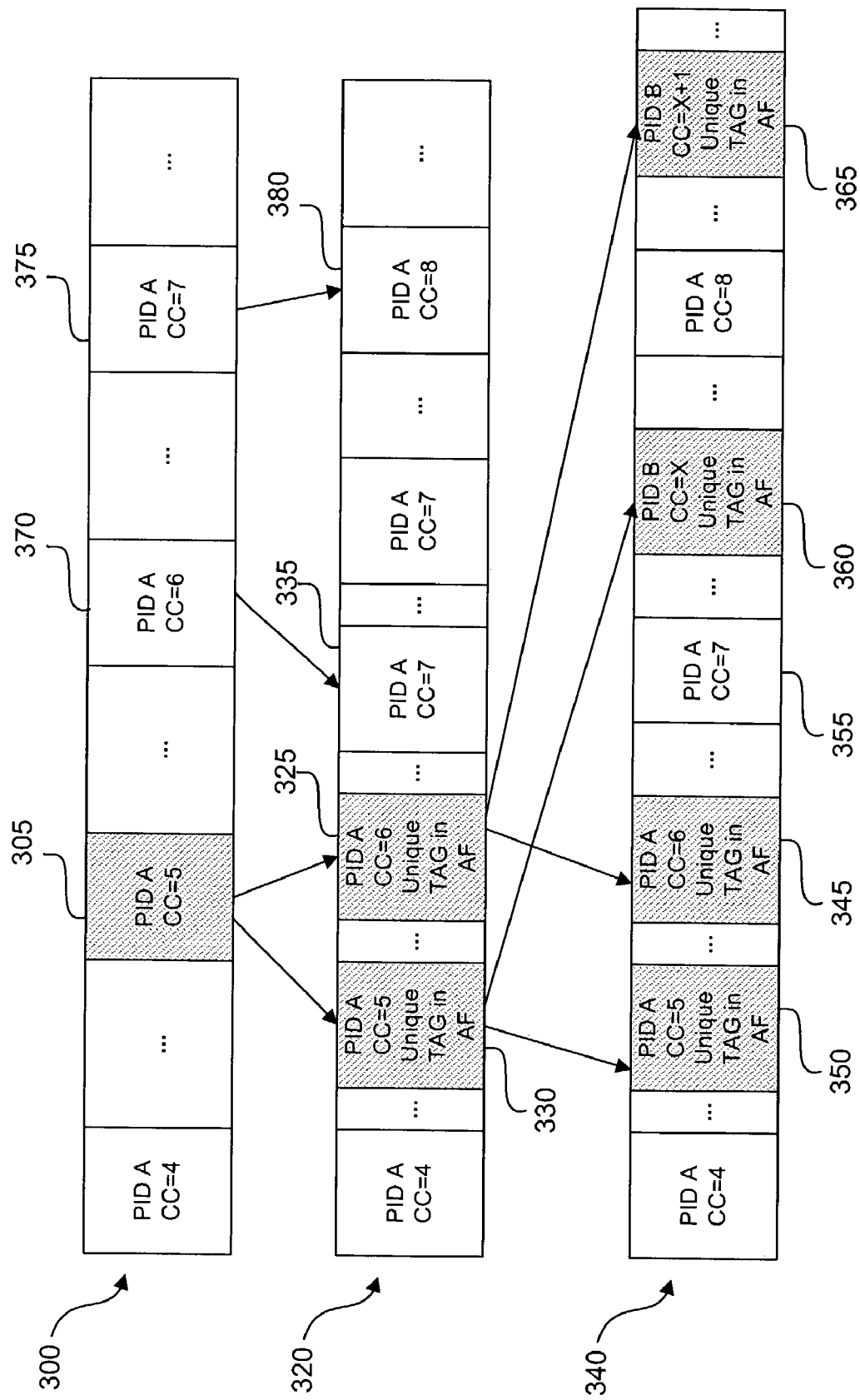
FIG. 2 is an exemplary transport system arrangement in accordance with an embodiment of the present invention.

FIG. 2 is an exemplary transport system arrangement in accordance with an embodiment of the present invention. Referring to FIG. 2, there is shown an original TS 300, a new stream 320 and a final new stream 340. The original TS 300 and the new stream 320 may be associated to a legacy system and/or a legacy system format, and the final new stream 340 may be associated with a legacy system and/or a new system and/or a legacy system format and/or a new system format. The original TS 300 may include a plurality of packets for one or more programs. The packets identified in TS 300 may belong to a program for a particular legacy system. In this regard, PID A may identify the packets of an ES as corresponding to that legacy system. A continuity counter (CC) field for the packets identified may be incremented by one, thereby signifying that the packets may be in sequence and no packets for the program are missing from that portion of TS 300. Packet 305 in TS 300 may be identified as a critical packet, which may have a continuity counter value of CC=5. Essentially, the CC may be regarded as a packet sequence number.

The new stream 320 is an exemplary TS that may be created in accordance with one embodiment of the invention. The new stream 320 may include a plurality of packets for one or more programs represented in TS 300. Accordingly, the new stream 320 may include at least some of the packets identified in TS 300 and additional packets that may belong to the same program corresponding to the packets of TS 300. The additional packets may include packets 330 and 325. The additional packets 330, 325 of PID A may be constructed or generated by replicating and replacing the critical packet 305 of PID A in the original TS 300.

The new stream 320 may be utilized by a legacy system rather than a new system, which corresponds to the original TS 300. In this regard, new stream 320 may be an intermediate stream that may be used to create final new stream 340, the latter of which may be utilized by both a legacy system and a new system. The additional packets 330, 325 may be used to create packets that may be intended for the new system. Packets intended for the new system may be identified with PID B. Some critical PID A packets for the legacy system may be called primary packets while the PID B packets may be called secondary packets.

In the new stream 320, PID A packets 330, 325 may be generated by replicating critical or primary PID A packet 305 in the original stream 300. Replication of the critical PID A packet 305 may result in a first packet 330 and a second packet 325. The first packet 330 may be a PID A packet that utilizes the same CC value as the primary PID A packet. In this case, the first PID A packet 330 and the primary PID A packet 305 may have, for example, a CC value of CC=5. The second PID A packet 325 may have a CC value that may be consecutive to the CC value of the critical PID A packet 305. In this case, the second PID A packet 325 may have a CC=6 value which may be consecutive to the CC=5 value of primary PID A packet 305.

Since the replication of primary PID A packet 305 results in an additional packet 325 that may have a CC value which may be consecutive to a CC value of the primary PID A packet 305, successive remaining packets in the new stream 320 may be renumbered so as to ensure proper sequencing or ordering of the packets. In this case, the CC=6 value for PID A packet 370 in TS 300 may be incremented by one, resulting in the PID A packet 335 of the new stream 320 having a CC value of CC=7. Similarly, the CC=6 value for PID A packet 375 in TS 300 may be incremented by one, resulting in PID A packet 380 having a CC value of CC=7.

In order to replicate primary PID A packet 305, packet 305 may be split into two separate packets. For example, primary PID A packet 305 which may have a payload of 184 bytes may be split into two packets, namely a 92-bit PID A packet 330 and a 92-bit PID A packet 325. A unique identifier or tag may be generated for each of the PID A packets 330, 325 and placed in the adaptation fields 122 (FIG. 1) of each of the PID A packets 330, 335. The unique identifier may be an n-bit tag where n is an integer. For example, the unique identifier may be 32-bit tag. The unique identifier may be in a format which may be numeric, alphabetic, or any combination thereof.

In the final new stream 340, packet 350 and 345 may be equivalent to packets 330 and 325 respectively. In order to generate the final new stream 340, secondary PID B packet 360 may be replicated from primary packet 330 and secondary PID B packet 365 may be replicated from primary packet 325. In this regard the unique identifier for secondary PID B packet 360 may be identical to the unique identifier in the adaptation field of primary packet 330. Similarly, the unique identifier or tag for secondary PID B packet 365 may be identical to the unique identifier in the adaptation field of primary packet 325. The CC values for secondary packets 360, 365 may be assigned depending on where they are located in the stream 340. Accordingly, the CC values for secondary packets 360, 365 may be denoted as X and X+1 respectively, where X may be the sequence number of the secondary packet 360 in the final new stream 340 and X+1 may represent a consecutive sequence number.

The identity between the unique identifiers of primary PID A packet 350 and secondary PID B packet 360 may permit co-relation of primary PID A packet 350 to secondary PID B packet 360. Similarly, the identity between the unique identifiers of primary PID A packet 345 and secondary PID B packet 365 may permit co-relation of primary PID A packet 345 to secondary PID B packet 365. Accordingly, a lookup table may be used to associate the PID A packets with corresponding PID B packets. In this case, the lookup table may contain entries for the primary PID A packet and the secondary PID B packet, which are linked by a common unique identifier. Accordingly, since the PID A and the PID B packets have the same unique identifier, the primary packets may be quickly and efficiently distinguished from the secondary packets and located by a legacy or a new system for decoding. Advantageously, there is no need to have a dependency on packet ordering and implementation and hardware requirements may be minimal.

Figure 3A:
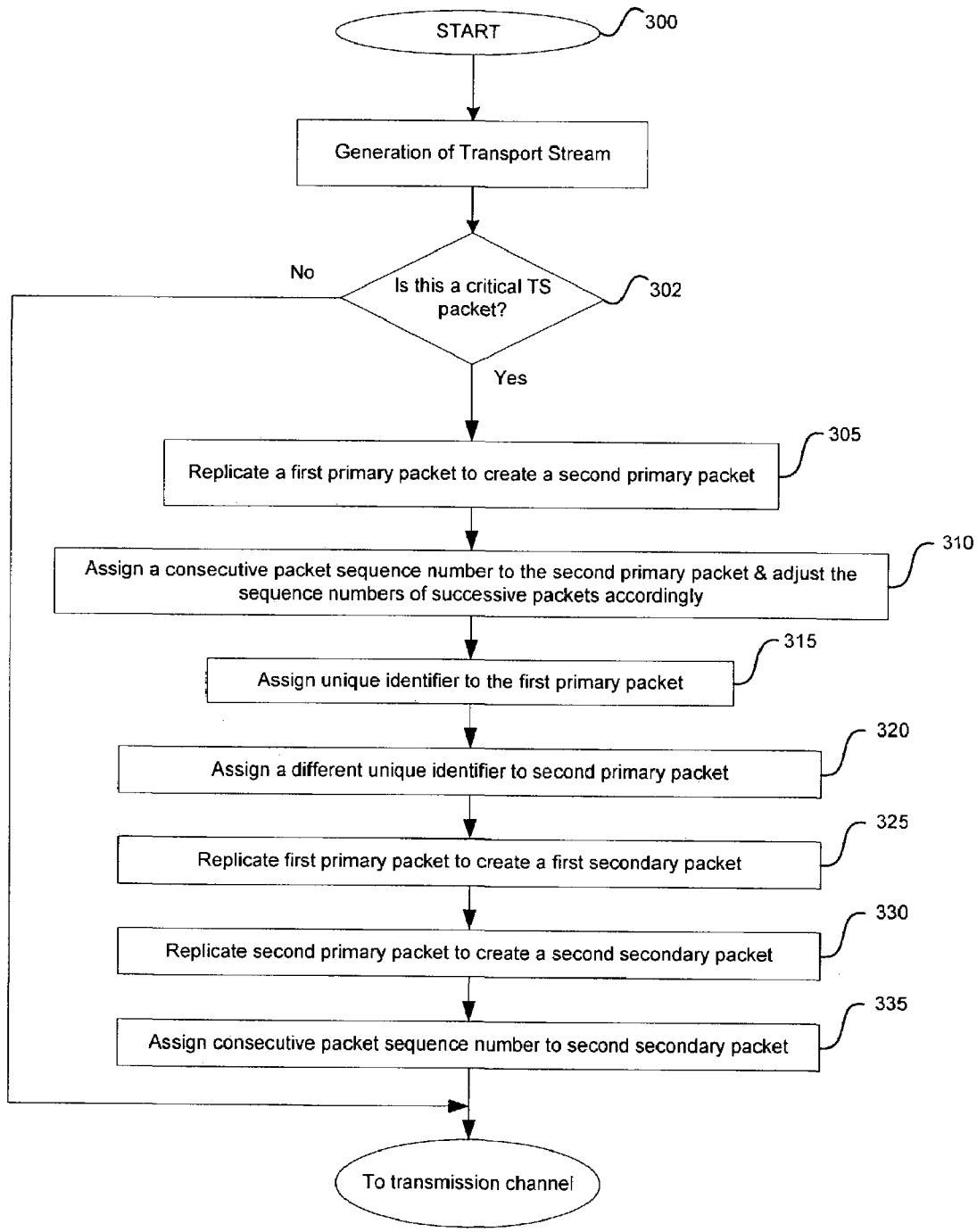
FIG. 3a is a flowchart illustrating exemplary steps for generating a new transport stream with replicated and co-related packets in accordance with an embodiment of the present invention.

FIG. 3a is a flowchart illustrating exemplary steps for generating a new transport stream with replicated and co-related packets in accordance with an embodiment of the present invention. Referring to FIG. 3a, the flowchart starts at step 300. Subsequently, in step 302, a decision may be made as to whether a packet is a critical TS packet. If the packet is not a critical packet, the packet maybe handled normally and transported over the transmission channel. However, in step 302, if the packet is a critical TS packet, then in step 305, a first primary packet may be replicated to create a second primary packet. The first primary packet may be a critical packet or PID A packet. The second primary packet may be a PID A packet. In step 310, a consecutive packet sequence number may be assigned to the second primary packet and the sequence number of remaining successive packets may be accordingly adjusted so that the successive packets may be in sequence relative to the second primary packet. In step 315, a unique identifier may be assigned to the first primary packet. In step 320, a different unique identifier may be assigned to the second primary packet. In step 325, the first primary packet may be replicated to create a first secondary packet. In step 330, the second primary packet may be replicated to create a second secondary packet. The first and second secondary packets may be PID B packets. In step 335, a consecutive packet sequence number may be assigned to the second secondary packet. The unique identifiers may be stored in a field such as an adaptation field of the packets.

Figure 3B:
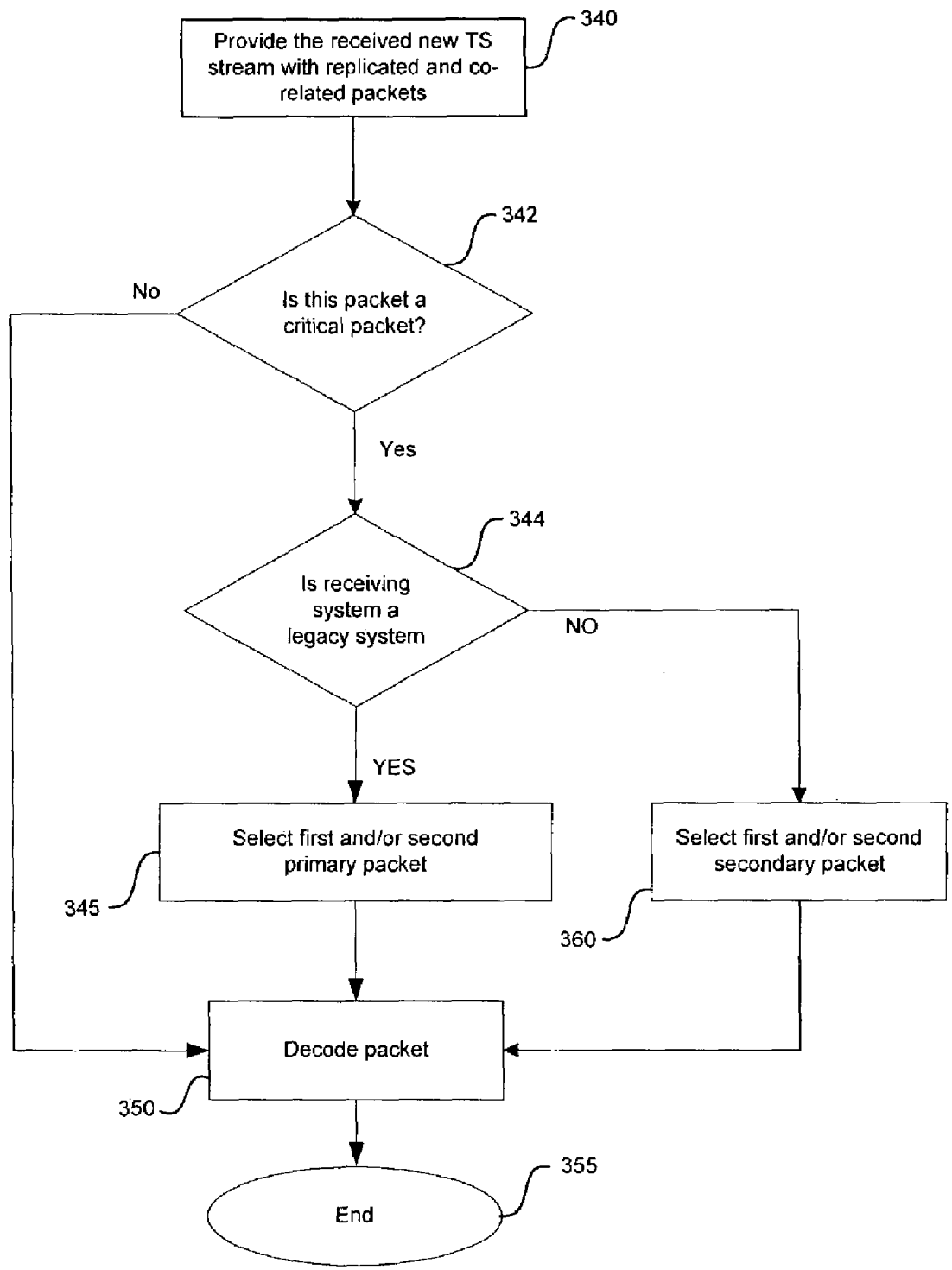
FIG. 3b is a flowchart illustrating exemplary steps for processing a transport stream with replicated and co-related packets in accordance with an embodiment of the present invention.

FIG. 3b is a flowchart illustrating exemplary steps for processing a new TS stream with replicated and co-related packets in accordance with an embodiment of the invention. The steps may be initiated with step 340 where the received new TS having replicated and co-related packets may be provided for processing. In step 342, a decision may be made as to whether a packet is a critical packet. If it is determined that the packet is not a critical packet, then the packet may be decoded in step 350. If it is determined that the packet is a critical packet, then in step 344, a decision may be made as to whether a receiving system is a legacy system. If it is determined that the receiving system is a legacy system, then in step 345, the first and/or second primary packet may be selected. Subsequently, in step 350, the selected packet may be decoded. Returning to step 344, if the receiving system is not a legacy system, then in step 360, the first and/or second secondary packet may be selected. Subsequently, in step 350, the selected packet may be decoded. After the packet is decoded in step 350, the steps may end at step 355.

The selection of packets for a legacy or new system may be based on the unique identifier assigned to the packet. In this regard, the unique identifier may facilitate selection of an appropriate packet based on whether a receiving system is a legacy or a new system. Furthermore, by assigning consecutive packet sequence numbers to the replicated packets, the packets may be easily located for decoding. Advantageously, there is no need to modify any local transport buffer models that may have been previously established for the legacy system. In addition, there is no dependency on packet ordering since replication of the packets preserves the original ordering.

Figure 4:
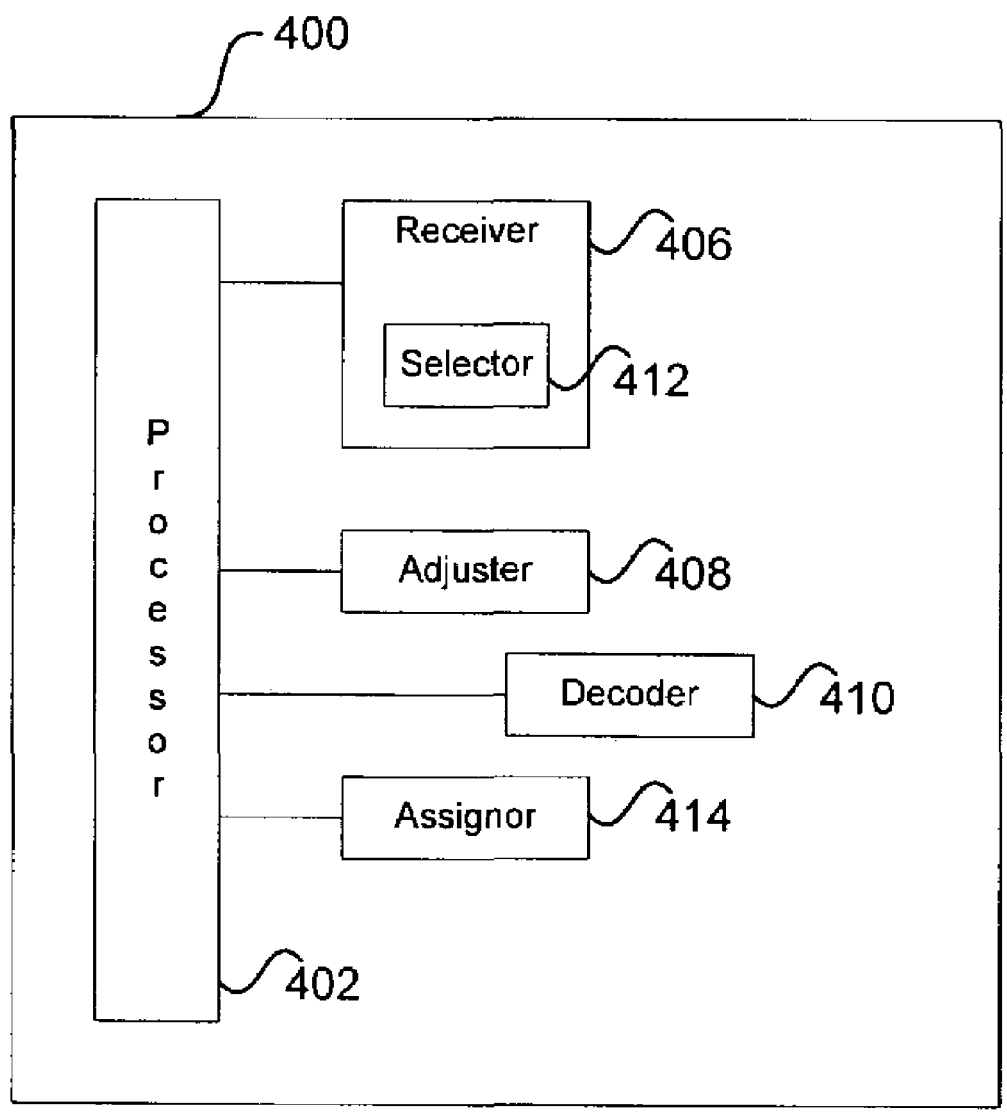
FIG. 4 is a block diagram of an exemplary processing system for co-relating packets in accordance with an embodiment of the invention.

FIG. 4 is a block diagram of an exemplary processing system for co-relating packets in accordance with an embodiment of the invention. Referring to FIG. 4, the processing system 400 may include a replicating processor 402, a receiver block 406, an adjuster block 408, decoder block 410 and an assignor block 414. The receiver block 406 may include a selector block 412. The processing system 400 may be adapted to co-relate packets using PIDs. The system for co-relating packets using PIDs may include at least one replicating processor 402 adapted to replicate a first primary packet in an assigned primary PID to create a second primary packet for the same primary PID. The replicating processor 402 may also replicate the first primary packet to create a first secondary packet in an assigned secondary PID. The replicating processor 402 may be configured to replicate the second primary packet to create a second secondary packet for the same secondary PID. In response to receipt of a TS stream with replicated packets by a receiver 406, a selector 412 may be adapted to select the first and/or the second primary packet for a legacy system. The selector 412 may also be adapted to select the first and/or second secondary packet for a new system based on the assigned unique identifier. The selector 412 may be configured to co-relate the selected first and/or second primary packet with a legacy system and also co-relate the selected first and/or second secondary packet with a new system.

An assignor 414 may be adapted to assign a packet sequence number to the second primary packet so that the assigned packet sequence number may be consecutive to a packet sequence number of the first primary packet. An adjuster 408 may be adapted to adjust a packet sequence number for successive packets for the particular PID so that the successive packets may remain in sequence relative to the second primary packet. The receiver 406 may receive the first primary packet and/or the second primary packet for the particular PID by the legacy system for processing. A decoder such as decoder 410, which may be associated with the legacy system may be adapted to decode the received first primary packet or the second primary packet. The receiver 406 may receive the first secondary packet and/or the second secondary packet from another PID by the new system. A decoder such as decoder 410, which may be associated with the new system may be adapted to decode the selected first secondary packet or the second secondary packet.

In one aspect of the invention, the selector 412 may select a primary packet PID corresponding to one of the first primary packet and the second primary packet if a receiving system is the legacy system. In another aspect of the invention, the selector 412 may select a secondary packet PID corresponding to one of the first secondary packet or the second secondary packet if the receiving system is the new system. The assignor 414 may be adapted to assign a packet sequence number to the second secondary packet that is consecutive to a packet sequence number of the first secondary packet. The first secondary packet and the first primary packet may have the same unique identifier while the second secondary packet and the second primary packet may have the same unique identifier. The unique identifier may be an n-bit number, where n is an integer greater than zero (0). The number may be alphabetic, numeric or alphanumeric.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises some or all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

The invention claimed is:

1. A method for co-relating transport packets on different channels having different PIDs for compatibility with a new system and a legacy system, the method comprising:

replicating a first primary packet to create a second primary packet for a particular channel;

assigning a unique identifier to said first primary packet and a different unique identifier to said second primary packet;

replicating said first primary packet to create a first secondary packet and said second primary packet to create a second secondary packet; and in response to the receipt of a new stream with replicated packets, selecting one of said first and said second primary packets and one of said first and said second secondary packets for said particular channel based on said assigned unique identifier in order to co-relate said selected one of said first and said second primary packets and said selected one of said first and said second secondary packets to one of the legacy system and the new system respectively.

2. The method according to claim 1, wherein said replicating of said first primary packet to create said second primary packet, comprises:

assigning a packet sequence number to said second primary packet, said assigned packet sequence number being consecutive to a packet sequence number of said first primary packet; and adjusting a packet sequence number of successive packets for said particular channel so that said successive packets remain in sequence relative to said second primary packet.

3. The method according to claim 1, wherein said selecting comprises:
receiving one of said first primary packet and said second primary packet for said particular channel by the legacy system; and
decoding said one of said received first primary packet and said second primary packet by a decoder of the legacy system.

4. The method according to claim 1, wherein said selecting comprises:
receiving one of said first secondary packet and said second secondary packet by the new system; and
decoding said one of said selected first secondary packet and said second secondary packet by a decoder of the new system.

5. The method according to claim 1, wherein said selecting comprises:
selecting a primary packet PID corresponding to one of said first primary packet and said second primary packet if said receiving system is the legacy system; and
selecting a secondary packet PID corresponding to one of said first secondary packet and said second secondary packet if said receiving system is the new system.

6. The method according to claim 1, wherein said replicating said first primary packet to create a first secondary packet and said second primary packet to create a second primary secondary packet, comprises assigning a packet sequence number to said second secondary packet that is consecutive to a packet sequence number of said first secondary packet.

7. The method according to claim 1, wherein said first secondary packet has said unique identifier assigned to said first primary packet and said second secondary packet has said unique identifier assigned to said second primary packet.

8. The method according to claim 1, wherein said unique identifier assigned to said first primary packet and said unique identifier assigned to said second primary packet is a n-bit number, where n is an integer greater than zero (0).

9. A machine-readable storage, having stored thereon a computer program having at least one code section executable by a machine for causing the machine to perform the steps comprising:
replicating a first primary packet to create a second primary packet for a particular channel to co-relate transport packets on different channels having different PIDs for compatibility with a new system and a legacy system;
assigning a unique identifier to said first primary packet and a different unique identifier to said second primary packet;
replicating said first primary packet to create a first secondary packet and said second primary packet to create a second secondary packet; and
in response to the receipt of a new stream with replicated packets, selecting one of said first and said second primary packets and one of said first and said second secondary packets for said particular channel based on said assigned unique identifier in order to co-relate said selected one of said first and said second primary packets and said selected one of said first and said second secondary packets to one of the legacy system and the new system respectively.

10. The machine-readable storage according to claim 9, wherein said at least one code section for replicating of said first primary packet to create a second primary packet, comprises:
code for assigning a packet sequence number to said second primary packet, said assigned packet sequence number being consecutive to a packet sequence number of said first primary packet; and
code for adjusting a packet sequence number of successive packets for said particular channel so that said successive packets remain in sequence relative to said second primary packet.

11. The machine-readable storage according to claim 9, wherein said selecting comprises:
receiving one of said first primary packet and said second primary packet for said particular channel by the legacy system; and
decoding said received one of said first primary packet and said second primary packet by a decoder for the legacy system.

12. The machine-readable storage according to claim 9, wherein said selecting comprises:
receiving one of said first secondary packet and said second secondary packet by the new system; and
decoding said selected one of said first secondary packet and said second secondary packet by a decoder of the new system.

13. The machine-readable storage according to claim 9, wherein said selecting comprises:
selecting a primary packet PID corresponding to one of said first primary packet and said second primary packet if said receiving system is the legacy system; and
selecting a secondary packet PID corresponding to one of said first secondary packet and said second secondary packet if said receiving system is the new system.

14. The machine-readable storage according to claim 9, wherein said at least one code section for replicating said first primary packet to create a first secondary packet and replicating said second primary packet to create a second secondary packet, comprises code for assigning a packet sequence number to said second secondary packet that is consecutive to a packet sequence number of said first secondary packet.

15. The machine-readable storage according to claim 9, wherein said first secondary packet has said unique identifier assigned to said first primary packet and said second secondary packet has said unique identifier assigned to said second primary packet.

16. The machine-readable storage according to claim 9, wherein said unique identifier assigned to said first primary packet and said unique identifier assigned to said second primary packet is a n-bit number, where n is an integer greater than zero (0).

17. A system for co-relating transport packets on different channels having different PIDs for compatibility with a new system and a legacy system, the system comprising:
at least one processor that replicates a first primary packet to create a second primary packet for a particular channel;
said at least one processor assigns a unique identifier to said first primary packet and a different unique identifier to said second primary packet;

said at least one processor for replicating said first primary packet to create a first secondary packet and said second primary packet to create a second primary secondary packet; and a selector for that enables selection of one of said first and said second primary packets and one of said first and said second secondary packets for said particular channel based on said assigned unique identifier in order to co-relate said selected one of said first and said second primary packets and said selected one of said first and said second secondary packets to one of the legacy system and the new system respectively, said selector responsive to the receipt of a new stream with replicated packets.

18. The system according to claim 17, wherein said at least one processor for replicating said first primary packet to create said second primary packet, comprises:

at least one assignor for assigning a packet sequence number to said second primary packet, said assigned packet sequence number being consecutive to a packet sequence number of said first primary packet; and said at least one assignor for adjusting a packet sequence number of successive packets for said particular channel so that said successive packets remain in sequence relative to said second primary packet.

19. The system according to claim 17, wherein said selector comprises:

a receiver for receiving one of said first primary packet and said second primary packet for said particular channel by the legacy system; and a decoder for decoding said one of said received first primary packet and said second primary packet by the legacy system.

20. The system according to claim 17, wherein said selector comprises:

a receiver for receiving one said first secondary packet and said second secondary packet by the new system; and a decoder for decoding said one of said selected first secondary packet and said second secondary packet by the new system.

21. The system according to claim 17, wherein said selector comprises:

at least one selector for selecting a primary packet PID corresponding to one of said first primary packet and said second primary if said receiving system is the legacy system; and said at least one selector for selecting a secondary packet PID corresponding to one of said first secondary packet and said second secondary packet if said receiving system is the new system.

22. The system according to claim 17, wherein said at least one replicating processor for replicating said first primary packet to create a first secondary packet and said second primary packet to create a second secondary packet, comprises an assignor for assigning a packet sequence number to said second secondary packet that is consecutive to a packet sequence number of said first secondary packet.

23. The system according to claim 17, wherein said first secondary packet has said unique identifier assigned to said first primary packet and said second secondary packet has said unique identifier assigned to said second primary packet.

24. The system according to claim 17, wherein said unique identifier assigned to said first primary packet and said unique identifier assigned to said second primary packet is a n-bit tag, where n is an integer greater than zero (0).

25. A method for co-relating transport packets on different channels having different PIDs for compatibility with a new system and a legacy system, the method comprising:

replicating a first primary packet to create a second primary packet for a particular channel;

assigning a unique identifier to said first primary packet and a different unique identifier to said second primary packet; and replicating said first primary packet to create a first secondary packet and said second primary packet to create a second secondary packet; wherein one of said first and said second primary packets and one of said first and said second secondary packets for said particular channel are selected based on said assigned unique identifier when a new stream with replicated packets is received, in order to co-relate said selected one of said first and said second primary packets and said selected one of said first and said second secondary packets to one of the legacy system and the new system respectively.

26. The method according to claim 25, wherein said replicating of said first primary packet to create said second primary packet, comprises:

assigning a packet sequence number to said second primary packet, said assigned packet sequence number being consecutive to a packet sequence number of said first primary packet; and adjusting a packet sequence number of successive packets for said particular channel so that said successive packets remain in sequence relative to said second primary packet.

27. The method according to claim 25, wherein for said selection of said one of said first and said second primary packets and one of said first and said second secondary packets for said particular channel:

one of said first primary packet and said second primary packet is received for said particular channel by the legacy system; and said one of said received first primary packet and said second primary packet is decoded by a decoder of the legacy system.

28. The method according to claim 25, wherein for said selection of one of said first and said second primary packets and one of said first and said second secondary packets for said particular channel:

one of said first secondary packet and said second secondary packet is received by the new system; and said one of said selected first secondary packet and said second secondary packet is decoded by a decoder of the new system.

29. The method according to claim 25, wherein for said selection of one of said first and said second primary packets and one of said first and said second secondary packets for said particular channel:

a primary packet PID corresponding to one of said first primary packet and said second primary packet is selected when said receiving system is the legacy system; and a secondary packet PID corresponding to one of said first secondary packet and said second secondary packet is selected when said receiving system is the new system.

30. The method according to claim 25, wherein said replicating of said first primary packet to create a first secondary packet and said second primary packet to create a second primary secondary packet, comprises assigning a packet sequence number to said second secondary packet that is consecutive to a packet sequence number of said first secondary packet.

31. The method according to claim 25, wherein said first secondary packet has said unique identifier assigned to said first primary packet and said second secondary packet has said unique identifier assigned to said second primary packet.

32. The method according to claim 25, wherein said unique identifier assigned to said first primary packet and said unique identifier assigned to said second primary packet is a n-bit number, where n is an integer greater than zero (0).

33. A method for co-relating transport packets on different channels having different PIDs for compatibility with a new system and a legacy system, the method comprising:
- selecting, in response to the receipt of a new stream with replicated packets, one of first and second primary packets and one of first and second secondary packets for a particular channel based on an assigned unique identifier in order to co-relate said selected one of said first and said second primary packets and said selected one of said first and said second secondary packets to one of the legacy system and the new system respectively;
- wherein, said first primary packet is replicated to create said second primary packet for said particular channel;
- said unique identifier is assigned to said first primary packet and a different unique identifier to said second primary packet; and
- said first primary packet is replicated to create said first secondary packet and said second primary packet is replicated to create said second secondary packet.

34. The method according to claim 33, wherein said replicating of said first primary packet to create a second primary packet, comprises:
- assigning a packet sequence number to said second primary packet, said assigned packet sequence number being consecutive to a packet sequence number of said first primary packet; and
- adjusting a packet sequence number of successive packets for said particular channel so that said successive packets remain in sequence relative to said second primary packet.

35. The method according to claim 33, wherein said selecting comprises:
- receiving one of said first primary packet and said second primary packet for said particular channel by the legacy system; and
- decoding said one of said received first primary packet and said second primary packet by a decoder of the legacy system.

36. The method according to claim 33, wherein said selecting comprises:
- receiving one of said first secondary packet and said second secondary packet by the new system; and
- decoding said one of said selected first secondary packet and said second secondary packet by a decoder of the new system.

37. The method according to claim 33, wherein said selecting comprises:
- selecting a primary packet PID corresponding to one of said first primary packet and said second primary packet if said receiving system is the legacy system; and
- selecting a secondary packet PID corresponding to one of said first secondary packet and said second secondary packet if said receiving system is the new system.

38. The method according to claim 33, wherein said step of replicating said first primary packet to create a first secondary packet and said second primary packet to create a second primary secondary packet, a packet sequence number is assigned to said second secondary packet that is consecutive to a packet sequence number of said first secondary packet, when said first primary packet is replicated to create said first secondary packet and said second primary packet is replicated to create said second primary secondary packet.

39. The method according to claim 33, wherein said first secondary packet has said unique identifier assigned to said first primary packet and said second secondary packet has said unique identifier assigned to said second primary packet.

40. The method according to claim 33, wherein said unique identifier assigned to said first primary packet and said unique identifier assigned to said second primary packet is a n-bit number, where n is an integer greater than zero (0).

41. A system for co-relating transport packets on different channels having different PIDs for compatibility with a new system and a legacy system, the system comprising:
- at least one processor that replicates a first primary packet to create a second primary packet for a particular channel;
- said at least one processor assigns a unique identifier to said first primary packet and a different unique identifier to said second primary packet; and
- said at least one processor replicates said first primary packet to create a first secondary packet and said second primary packet to create a second secondary packet; wherein,
- one of said first and said second primary packets and one of said first and said second secondary packets for said particular channel are selected based on said assigned unique identifier when a new stream with replicated packets is received, in order to co-relate said selected one of said first and said second primary packets and said selected one of said first and said second secondary packets to one of the legacy system and the new system respectively.

42. The system according to claim 41, wherein for said replicating of said first primary packet to create said second primary packet, said at least one processor:
- enables assignment of a packet sequence number to said second primary packet, said assigned packet sequence number being consecutive to a packet sequence number of said first primary packet; and
- enables adjustment of a packet sequence number of successive packets for said particular channel so that said successive packets remain in sequence relative to said second primary packet.

43. The system according to claim 41, wherein for said selection of said one of said first and said second primary packets and one of said first and said second secondary packets for said particular channel:
- one of said first primary packet and said second primary packet is received for said particular channel by the legacy system; and
- said one of said received first primary packet and said second primary packet is decoded by a decoder of the legacy system.

44. The system according to claim 41, wherein for said selection of one of said first and said second primary packets and one of said first and said second secondary packets for said particular channel:

one of said first secondary packet and said second secondary packet is received by the new system; and said one of said selected first secondary packet and said second secondary packet is decoded by a decoder of the new system.

45. The system according to claim 41, wherein for said selection of one of said first and said second primary packets and one of said first and said second secondary packets for said particular channel:

a primary packet PID corresponding to one of said first primary packet and said second primary packet is selected when said receiving system is the legacy system; and a secondary packet PID corresponding to one of said first secondary packet and said second secondary packet is selected when said receiving system is the new system.

46. The system according to claim 41, wherein said at least one processor enables assignment of a packet sequence number to said second secondary packet that is consecutive to a packet sequence number of said first secondary packet.

47. The system according to claim 41, wherein said first secondary packet has said unique identifier assigned to said first primary packet and said second secondary packet has said unique identifier assigned to said second primary packet.

48. The system according to claim 41, wherein said unique identifier assigned to said first primary packet and said unique identifier assigned to said second primary packet is a n-bit number, where n is an integer greater than zero (0).

49. A system for co-relating transport packets on different channels having different PIDs for compatibility with a new system and a legacy system, the system comprising:

one or more circuits that, in response to the receipt of a new stream with replicated packets, enables selection of one of first and second primary packets and one of first and second secondary packets for a particular channel based on an assigned unique identifier in order to co-relate said selected one of said first and said second primary packets and said selected one of said first and said second secondary packets to one of the legacy system and the new system respectively;

wherein, said first primary packet is replicated to create said second primary packet for said particular channel;

said unique identifier is assigned to said first primary packet and a different unique identifier to said second primary packet; and said first primary packet is replicated to create said first secondary packet and said second primary packet is replicated to create said second secondary packet.

50. The system according to claim 49, wherein for said replicating of said first primary packet to create said second primary packet, a packet sequence number is assigned to said second primary packet, said assigned packet sequence number being consecutive to a packet sequence number of said first primary packet; and a packet sequence number of successive packets is adjusted for said particular channel so that said successive packets remain in sequence relative to said second primary packet.

51. The system according to claim 49, wherein said one or more circuits comprises a receiver and a decoder, wherein:

said receiver receives one of said first primary packet and said second primary packet for said particular channel by the legacy system; and said decoder decodes said one of said received first primary packet and said second primary packet by a decoder of the legacy system.

52. The system according to claim 49, wherein said one or more circuits comprises a receiver and a decoder, wherein:

said receiver enables receiving of one of said first secondary packet and said second secondary packet by the new system; and said decoder enables decoding of said one of said selected first secondary packet and said second secondary packet by a decoder of the new system.

53. The system according to claim 49, wherein said one or more circuits enables:

selection of a primary packet PID corresponding to one of said first primary packet and said second primary packet if said receiving system is the legacy system; and selection of a secondary packet PID corresponding to one of said first secondary packet and said second secondary packet if said receiving system is the new system.

54. The system according to claim 49, wherein, for said replicating of said first primary packet to create a first secondary packet and said second primary packet to create a second primary secondary packet, a packet sequence number is assigned to said second secondary packet that is consecutive to a packet sequence number of said first secondary packet.

55. The system according to claim 49, wherein said first secondary packet has said unique identifier assigned to said first primary packet and said second secondary packet has said unique identifier assigned to said second primary packet.

56. The system according to claim 49, wherein said unique identifier assigned to said first primary packet and said unique identifier assigned to said second primary packet is a n-bit number, where n is an integer greater than zero (0).

57. A machine-readable storage, having stored thereon a computer program having at least one code section executable by a machine for co-relating transport packets on different channels having different PIDs for compatibility with a new system and a legacy system, said computer program causing the machine to perform steps comprising:

replicating a first primary packet to create a second primary packet for a particular channel;

assigning a unique identifier to said first primary packet and a different unique identifier to said second primary packet; and replicating said first primary packet to create a first secondary packet and said second primary packet to create a second secondary packet; wherein one of said first and said second primary packets and one of said first and said second secondary packets for said particular channel are selected based on said assigned unique identifier when a new stream with replicated packets is received, in order to co-relate said selected one of said first and said second primary packets and said selected one of said first and said second secondary packets to one of the legacy system and the new system respectively.

58. The machine-readable storage according to claim 57, wherein said at least one code section comprises code for:

assigning a packet sequence number to said second primary packet, said assigned packet sequence number being consecutive to a packet sequence number of said first primary packet; and adjusting a packet sequence number of successive packets for said particular channel so that said successive packets remain in sequence relative to said second primary packet.

59. The machine-readable storage according to claim 57, wherein for said selection of said one of said first and said second primary packets and one of said first and said second secondary packets for said particular channel:
one of said first primary packet and said second primary packet is received for said particular channel by the legacy system; and
said one of said received first primary packet and said second primary packet is decoded by a decoder of the legacy system.

60. The machine-readable storage according to claim 57, wherein for said selection of one of said first and said second primary packets and one of said first and said second secondary packets for said particular channel:
one of said first secondary packet and said second secondary packet is received by the new system; and
said one of said selected first secondary packet and said second secondary packet is decoded by a decoder of the new system.

61. The machine-readable storage according to claim 57, wherein for said selection of one of said first and said second primary packets and one of said first and said second secondary packets for said particular channel:
a primary packet PID corresponding to one of said first primary packet and said second primary packet is selected when said receiving system is the legacy system; and
a secondary packet PID corresponding to one of said first secondary packet and said second secondary packet is selected when said receiving system is the new system.

62. The machine-readable storage according to claim 57, wherein said at least one code section comprises code for assigning a packet sequence number to said second secondary packet that is consecutive to a packet sequence number of said first secondary packet.

63. The machine-readable storage according to claim 57, wherein said first secondary packet has said unique identifier assigned to said first primary packet and said second secondary packet has said unique identifier assigned to said second primary packet.

64. The machine-readable storage according to claim 57, wherein said unique identifier assigned to said first primary packet and said unique identifier assigned to said second primary packet is a n-bit number, where n is an integer greater than zero (0).

65. A machine-readable storage, having stored thereon a computer program having at least one code section executable by a machine for co-relating transport packets on different channels having different PIDs for compatibility with a new system and a legacy system, said computer program causing the machine to perform steps comprising:
selecting, in response to the receipt of a new stream with replicated packets, one of first and second primary packets and one of first and second secondary packets for a particular channel based on an assigned unique identifier in order to co-relate said selected one of said first and said second primary packets and said selected one of said first and said second secondary packets to one of the legacy system and the new system respectively;
wherein, said first primary packet is replicated to create said second primary packet for said particular channel;
said unique identifier is assigned to said first primary packet and a different unique identifier to said second primary packet; and
said first primary packet is replicated to create said first secondary packet and said second primary packet is replicated to create said second secondary packet.

66. The machine-readable storage according to claim 65, wherein said replicating of said first primary packet to create a second primary packet, comprises:
assigning a packet sequence number to said second primary packet, said assigned packet sequence number being consecutive to a packet sequence number of said first primary packet; and
adjusting a packet sequence number of successive packets for said particular channel so that said successive packets remain in sequence relative to said second primary packet.

67. The machine-readable storage according to claim 65, wherein said at least one code section comprises code for comprises:
receiving one of said first primary packet and said second primary packet for said particular channel by the legacy system; and
decoding said one of said received first primary packet and said second primary packet by a decoder of the legacy system.

68. The machine-readable storage according to claim 65, wherein said at least one code section comprises code for comprises:
receiving one of said first secondary packet and said second secondary packet by the new system; and
decoding said one of said selected first secondary packet and said second secondary packet by a decoder of the new system.

69. The machine-readable storage according to claim 65, wherein said at least one code section comprises code for comprises:
selecting a primary packet PID corresponding to one of said first primary packet and said second primary packet if said receiving system is the legacy system; and
selecting a secondary packet PID corresponding to one of said first secondary packet and said second secondary packet if said receiving system is the new system.

70. The machine-readable storage according to claim 65, wherein a packet sequence number is assigned to said second secondary packet that is consecutive to a packet sequence number of said first secondary packet, when said first primary packet is replicated to create said first secondary packet and said second primary packet is replicated to create said second primary secondary packet.

71. The machine-readable storage according to claim 65, wherein said first secondary packet has said unique identifier assigned to said first primary packet and said second secondary packet has said unique identifier assigned to said second primary packet.

72. The machine-readable storage according to claim 65, wherein said unique identifier assigned to said first primary packet and said unique identifier assigned to said second primary packet is a n-bit number, where n is an integer greater than zero (0).

* * * * *